United States Patent [19]

Verlaeten et al.

[11] 4,061,718

[45] Dec. 6, 1977

[54] METHOD FOR THE RECOVERY OF AMMONIA FROM LIQUOR FROM THE FILTERS OF AMMONIA-SODA PLANTS

[75] Inventors: Jean Verlaeten; Paul Demilie, both of Brussels, Belgium

[73] Assignee: Solvay & Cie., Brussels, Belgium

[21] Appl. No.: 628,960

[22] Filed: Nov. 5, 1975

[30] Foreign Application Priority Data

Nov. 9, 1974  France ............................ 74.37846

[51] Int. Cl.$^2$ .............................................. C01C 1/02
[52] U.S. Cl. ................................... 423/356; 423/190; 423/357; 423/421
[58] Field of Search ............... 423/356, 357, 420, 421, 423/190, 423, 424, 497

[56] References Cited

U.S. PATENT DOCUMENTS

| 1,118,332 | 11/1914 | Clemm | 423/356 |
|---|---|---|---|
| 1,838,587 | 12/1931 | Sperr | 423/357 |
| 3,329,479 | 7/1967 | Hustinx | 423/190 |

FOREIGN PATENT DOCUMENTS

| 542,096 | 6/1957 | Canada | 423/356 |
|---|---|---|---|
| 82,328 | 9/1970 | Germany | 423/423 |
| 1,141,267 | 12/1962 | Germany | 423/356 |
| 164,335 | 6/1921 | United Kingdom | 423/356 |
| 216,672 | 4/1968 | U.S.S.R. | 423/423 |

*Primary Examiner*—Earl C. Thomas
*Assistant Examiner*—Eugene T. Wheelock
*Attorney, Agent, or Firm*—Spencer & Kaye

[57] ABSTRACT

A method for the recovery of ammonia from liquor from the filters of ammonia-soda plants, which contains free ammonia and ammonium chloride. In this method the liquor is heated to release the free ammonia, and the remaining liquor is then treated successively in a prelimer with lime in an amount insufficient to decompose the whole part of the ammonium chloride and in a still with steam and an alkali metal hydroxide in an amount sufficient to decompose the remaining part of ammonium chloride.

8 Claims, 3 Drawing Figures

METHOD FOR THE RECOVERY OF AMMONIA FROM LIQUOR FROM THE FILTERS OF AMMONIA-SODA PLANTS

The present invention relates to an improved method of recovering ammonia from liquor from the filters of ammonia-soda plants, a method which allows the amount of basic agent employed to be reduced to the minimum and thus minimising the formation of residual sludges and pollution of rivers.

It is known that in the method of manufacturing soda by the ammonia-soda process a sodium chloride brine saturated with ammonia is carbonated by means of carbon dioxide, this causing the precipitation of sodium bicarbonate, which is separated, for example by filtration, and which is calcined to form sodium carbonate, while the mother liquor from the crystallisation of the bicarbonate is treated to recover the ammonia for recycling. This mother liquor consists of an aqueous solution containing in solution principally ammonium chloride, but since the conversion of the sodium chloride is not complete the mother liquor also contains a relatively large proportion of sodium chloride; free ammonia is also found in it, that is to say ammonia itself and volatile ammoniacal compounds, for example ammonium bicarbonate and carbonate, as well as impurities from the brine fed into the process. The operation of recovering ammonia, called "distillation", is carried out in a plant comprising a column of which the upper portion functions as heater and the lower portion as a still, a tank with agitator called a prelimer being interposed in the circulation of the liquor between these two portions to provide for the addition of a basic agent, for example lime or milk of lime; steam is introduced at the bottom of the still to act as both heating agent and sweeping agent. In such a plant, the volatile ammoniacal compounds are decomposed in the heater and the decomposition products (ammonia and carbon dioxide) as well as the free ammonia are entrained by the rising current of steam; in the prelimer, the ammonium chloride is dissociated by the basic agent liberating ammonia and chloride of the metal of the basic agent (calcium chloride when lime is used). The still serves to complete the dissociation of ammonium chloride and to bring about entrainment in the steam of the gaseous constituents present in the dissolved state.

In order to ensure recovery of as high a proportion as possible of the ammonia, up to the present time the basic agent has always been used in excess with respect to the amount stoichiometrically necessary for dissociation of the ammonium chloride (cf. TE-PANG HOU - Manufacture of Soda 2nd edition, 1942, p. 239).

Ways of ensuring this excess have been described. Thus, according to British Pat. No. 715 dated Feb. 9, 1883, in the name of L. MOND, no provision is made for preliming and milk of lime is introduced at the head of the still, but an introduction of milk of lime is provided at the foot of the column to avoid a possible deficit of lime.

According to a method described in U.S. Pat. No. 2,781,244 dated Sept. 18, 1952, filed by C. F. HECKLINGER and assigned to Allied Chemicals and Dye Corp., an attempt is made to reduce the excess of lime employed by using a control system. Finding that it is not possible to control the flow of milk of lime introduced into the prelimer as a function of the pH of the liquor leaving the still because the curve of pH response (as a function of the excess or deficit of lime) is not sufficiently pronounced over its whole range, this difficulty is circumvented by proposing to introduce into the prelimer in controlled manner only a part (about 85-95%) of the stoichiometric amount of lime based on a pre-imposed value of pH in a zone close to the turning point (pH = 9.23), but less than this, where the response is most rapid; a fixed balance of milk of lime is further added into the conduit between the prelimer and the still so as to ensure overall the presence of a slight excess of lime.

The prior methods described above demand therefore always the use of an excess of lime to denude the mother liquor completely of ammonium chloride. If a lime of low reactivity is used, this excess can reach 10% by weight and is completely lost with the sludges removed at the foot of the still, sludges of which the volume is moreover the greater as the excess of lime used is larger. Furthermore, if the residual liquors are voided to the river, the residual excess of lime gives them a high pH which obviously contributes to pollution.

The applicant has found a method which allows these disadvantages to be avoided by eliminating the need to use an excess of basic agent.

The method according to the present invention consists of carrying out the recovery of ammonia from liquor from the filters of ammonia-soda plants which contains more particularly free ammonia and ammonium chloride, wherein the liquor is heated and traversed by a current of steam in a heating column to release more particularly the free ammonia, then it is treated in a prelimer with a basic agent in an amount sufficient to decompose the major part but not all of the ammonium chloride with liberation of ammonia and is finally treated with steam so as to entrain the liberated gaseous products in a still where also is introduced the balance of basic agent needed to decompose the whole of the ammonium chloride, the said method being characterised in that the basic agent used in the prelimer is lime and the balance used in the still is an alkali metal hydroxide. According to a preferred form of the invention, the amount of basic agent forming the balance introduced into the still is added without exceeding the amount stoichiometrically necessary to dissociate all the ammonium chloride.

Control of the amount of basic agent to be added as the balance into the still may be effected by any method sensitive to the presence of ammonium ions, for example by using a selective electrode. A signal provided by a measurement of the pH of the liquor circulating in the still close to its outlet may advantageously be employed.

The alkali metal hydroxide serving as the balance of basic agent may be for example caustic soda in aqueous solution obtained by a chemical method or by an electrolytic method. In the latter case, there may be used practically pure caustic solutions, such as those prepared by electrolysis of a sodium chloride brine in mercury cells, or solutions containing both caustic soda and sodium chloride prepared in diaphragm cells, the NaCl content optionally having been reduced by a treatment to concentrate the solutions in respect of NaOH.

Indeed, electrolytic caustic soda has earlier been used to regenerate the ammonia from liquor from the filters of soda plants. Such a process is described for example in German Pat. No. 270,619 dated Dec. 4, 1912, in the name of A. CLEMM, and in the corresponding French Pat. No. 460,837 dated July 23, 1913, but this process is concerned with the total abolition of the use of lime and the method in no way aims at attempting to avoid the use of an excess of basic agent. The method according to the present invention is based on the fact that the replacement of lime by an alkali metal hydroxide in the second stage of the dissociation of the ammonium chloride allows of regulating exactly the quantities of basic agent to be used, for example in response to a measurement of pH made near the still exit.

If control of the amount of alkali metal hydroxide to employ as balance is based on a measurement of the pH of the liquor leaving the still or close to the still exit, the method of pH measurement and the apparatus associated with it for regulating the feed of the necessary balance of alkali metal hydroxide may be of any type well known to the expert in the art. The critical level of pH to be maintained at the still exit is about 9.5. There may advantageously be used two pH-meters placed respectively the one on the last tray and the other on the tray preceding that one where the balance of alkali metal hydroxide is introduced into the distillation column.

The addition of milk of lime or lime itself is made into the prelimer, as in the classical soda plant, but using a deficiency of lime with respect to the amount of ammonium chloride contained in the liquor of the heater fed into the prelimer. The addition of the aqueous solution of alkali metal hydroxide, used as balance to maintain the pH at the still exit at about 9.5, may be made on to one of the last trays of the distillation column or at the top of a second column placed in series with the main column, the steam then being introduced at the foot of this second column. The latter variant is for example justified if the existing columns in the soda plant employed, which are to be adapted to the method according to the invention, are not sufficiently effective to ensure that the lime is used up in the section upstream of the introduction of the balance of basic agent and/or to ensure the dissociation of the residual ammonium chloride by the balance of basic agent in the section downstream of the introduction of the said balance. If a second column placed in series is employed, the pH-meters are placed for example at the feet of the two columns.

The advantages of the method according to the invention reside in the complete use of the lime, which results in an economy of reagent and a very noticeable reduction in the volume of the residual sludges from the distillation. Moreover, the complemental use of a solution of alkali metal hydroxide without excess with respect to the stoichiometric amount allows any adventitious content of magnesium compounds in the lime fed to the first stage to be exploited, exploitation due to the conversion of these magnesium compounds to magnesium hydroxide, which is also capable of dissociating ammonium chloride under the conditions described above. The possibility of exactly controlling the amounts of basic agent used allows the avoidance of too high a pH in the residual liquors possibly passed as waste to the river. Finally, in comparison to the CLEMM process, which employs only caustic soda for distillation, the method according to the present invention has the advantage of being much more economical because of the lower cost of lime.

For reasons of economy, the portion of the basic agent which consists of lime will be as large as possible but such that it can be guaranteed never to exceed the stoichiometric amounts. A fraction lying between 75 and 99% of the stoichiometric amount generally meets this criterion.

The appended FIGS. 1 and 2 illustrate schematically some examples of industrial embodiments of the method according to the invention, without, however, limiting the scope of the patent to these particular embodiments.

Figure 1:
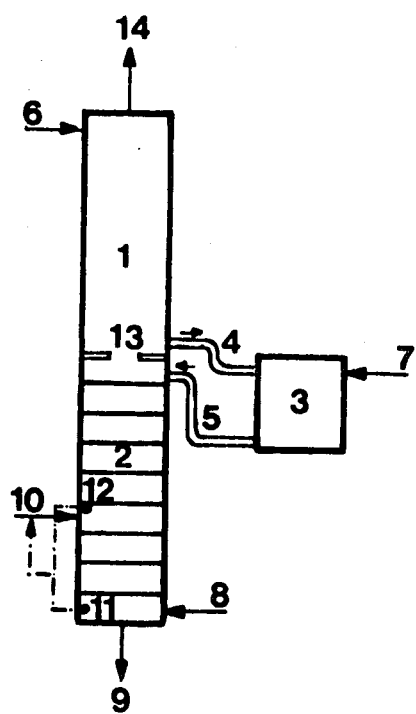
FIG. 1 represents schematically the ammonia-recovery installation of an ammonia-soda plant in which the method of the invention is applied using the distillation column previously in service.

In these FIGS. 1 represents the heater, 2 and 2' the still or stills, 3 the prelimer, 4 and 5 the pipes conveying liquor from the heater to the prelimer and conveying liquor from the prelimer to the still, 6 the inlet for liquor from the filters of the soda plant to the heating column, 13 the plate separating the heater and the still, 14 the outlet for gases and vapours from the heater, 7 the inlet for milk of lime to the prelimer, 8 the inlet for steam at the bottom of the still, 9 the outlet for liquor and sludges from the still, 10 the inlet for the solution of alkali metal hydroxide as balance of basic agent, and 11 and 12 the system of pH-meters and control equipment determining, as a function of the measured pH values, the amount of alkali metal hydroxide to be introduced as balance at 10.

For operation of this installation, according to the present invention, the liquor from the filters of the soda plant — which contains, dissolved in water, in particular ammonium chloride, free ammonia and sodium chloride-passes at 6 into the heater 1 where the rising current of steam entrains the ammonia and carbon dioxide liberated towards the top 14 of the column; at the bottom of the heater, the liquor passes by way of pipe 4 into the prelimer 3 where it is submitted for some time, with agitation, to the action of a milk of lime introduced at 7. The amount of lime added here is always less than the amount stoichiometrically necessary to liberate the ammonia fixed in the ammonium chloride; for example, 75-99% of the stoichiometric amount is added. The control of this amount may be carried out through measurement of pH at 12 according to the method described in U.S. Pat. No. 2,781,244. Next, the liquor leaves the prelimer 3 and passes by way of pipe 5 to the top of the distillation column 2 in which the dissociation of the fixed ammonia compounds ($NH_4Cl$...) and the entrainment of the gases by the steam introduced at 8 have to be completed. The liquor, freed from ammonia, and the sludges leave the still at 9. In order to allow completion of the dissociation of the ammonium chloride, there is introduced at 10, a little below the centre of the height of the still for example, the necessary balance of basic agent, and this in the form of an aqueous solution of an alkali metal hydroxide, for example of electrolytic caustic soda. In the form in which the invention is carried out according to FIGS. 1 and 2, the calculation of the amount of the balance of basic agent to add into the still is carried out continuously and automatically by measurements of pH taken at two points in the distillation column, one at 11 being very close to the liquor outlet and the other at 12 preceding the point of introduction of the balance of alkali metal hydroxide into the column; the combined result of these two measurements is used as a signal transmitted to the valve operating the feed of the balance of basic agent at 10.

Figure 2:
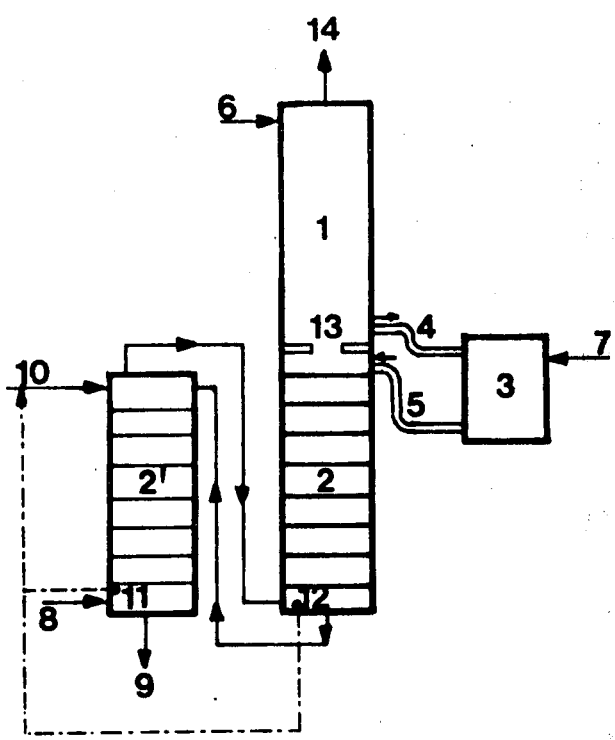
FIG. 2 represents an installation in which the existing distillation column has been extended by a new column placed in series with the old column.

According to FIG. 2, the original still 2 being inadequate, it has been necessary to connect up a second column 2' in series with the first one. The steam is introduced at the foot of column 2', at 8, and the balance of basic agent is introduced at the top of this column, at 10. The pH-meters 11 and 12 are placed respectively at the bottom of the two columns and the device controlling the introduction of the balance of basic agent at the top of the second column.

Figure 3:
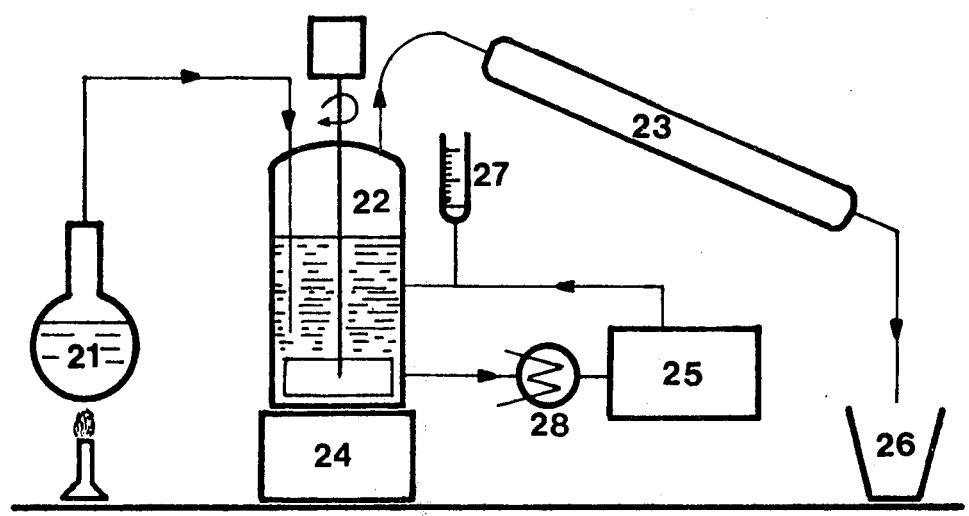

The advantages of the method according to the invention are made evident by the tests described in the first three of the following examples, of which the first two are reference examples. For these tests, the laboratory set-up shown in the diagram of FIG. 3 was used. This assembly comprises a flask 21 for the production of steam, a reactor with stirrer 22, a condenser 23, an electric hot-plate 24, a pH-recorder 25, a receiver for measuring condensates 26 and a burette 27 for introducing a solution of caustic soda. The hot-plate 24 is adjusted so as to compensate for the thermal losses of the reactor. The pH measurement is carried out after cooling the liquor to ambient temperature in 28.

The reagents used in the trials are a solution A, which is intended to represent the liquor leaving the heater, and a milk of lime of the following compositions Solution A $NH_4Cl$: 142.6 g/l (2.67N)
$NH_3$: 16.4 g/l
$NH_4HCO_3$: 3.8 g/l
NaCl: 70.1 g/l Milk of Lime Caustic alkalinity: 8.54N

EXAMPLE 1

Into the reactor 22 (see FIG. 3) there are introduced 1.5 liter of solution A and 489 cm³ of milk of lime, i.e. an excess of 3% over the stoichiometric amount. The reagents are first heated to 80° C. After half-an-hour of agitation, the pH is 11.7 Steam produced in the flask 21 is injected. 1218 cm³ of distillate are collected, in 26, in 90 minutes. The pH of the liquor is 11.45 The free $NH_3$ content of the liquor is 6.8 mg/l The total volume of sludges filtered on a buchner is 138 cm³.

EXAMPLE 2

Into the reactor 22 (see FIG. 3) there are introduced 1.5 liter of solution A and 445 cm³ of milk of lime, i.e. a deficit of 5% with respect to the stoichiometric amount. The reagents are first heated to 80° C. After half-an-hour of agitation, the pH is 10.75. Steam produced in the flask 21 is injected. 1343 cm³ of distillate are collected, in 26, in 105 minutes. the pH of the clear liquor is 7.65. The free $NH_3$ content of the liquor is 170 mg/l. The $NH_4Cl$ content is 3 g/l. The total volume of sludges filtered on a buchner is 73 cm³.

In comparison with Example 1, it is seen that the use of a deficit of lime-instead of an excess — lowers the pH of the final liquor as well as the volume of the filtered sludges, but increases very considerably the free $NH_3$ content of the final liquor. Moreover, as should be expected, the whole of the $NH_4Cl$ has not been dissociated. The recovery of the ammonia is not therefore satisfactory.

EXAMPLE 3

Into the reactor 22 (see FIG. 3) there are introduced 1/5 liter of solution A and 445 cm³ of milk of lime, i.e. a deficit of 5% with respect to the stoichiometric amount. The reagents are first heated to 80° C. After half-an-hour of agitation, the pH is 10.75. Steam produced in the flask 21 is injected. 240 cm³ of distillate are collected, in 26, in 33 minutes. The pH of the liquor is 9.5. Starting at this time, 175 cm³ of a N solution of NaOH contained in the burette 27 are injected so as to maintain the pH at 9.5. A further 1161 cm³ of distillate are collected in 64 minutes. The pH of the liquor has remained at 9.5. The free $NH_3$ content of the liquor is 17 mg/l. There is no more $NH_4Cl$ in solution. The total volume of sludges filtered on a buchner is 80 cm³.

This Example shows that, in comparison with the classical method (Example 1), the method according to the invention allows the pH of the final liquor to be lowered and the volume of the sludges to be reduced, while avoiding the use of an excess of reagent. In both cases the dissociation of $NH_4Cl$ is complete.

In comparison with Example 2, in which a deficit of lime is employed, in this Example complete dissociation of the $NH_4Cl$ and a lower content of free ammonia in the final liquor are obtained, which ensures a satisfactory recovery of the ammonia in the soda plant.

EXAMPLE 4

This Example describes an industrial application of the method of the invention.

In the installation depicted in FIG. 1, the prelimer 3 is fed at 4 with the liquor coming from the heater 1 at a rate of 100 m³/h. The composition of this liquor is as follows:

$NH_4Cl$: 148.5 g/l
NaCl: 62.8 g/l
$NH_3$: 16.7 g/l
$NH_4HCO_3$: 2.0 g/l

At 7 is introduced milk of lime, the alkalinity of which corresponds to 348g $Ca(OH)_2$/l, i.e. an alkalinity of 9.4 N. The amount of milk of lime introduced corresponds to neutralisation of the bicarbonate and the destruction of 95% of the $NH_4Cl$, i.e. 28.3 m³/h. The regulation of this flow is carried out automatically as a function of the pH at the point 12, which should be close to 9.5. The balance of alkali is supplied in the form of solution of the following composition:

NAOH: 121.8 g/l
NaCl: 194.1 g/l

The stoichiometric flow of 4.5 m³/h is automatically controlled as a function of the pH measurements at 11 and 12.

The solution at the base of the column does not contain more than 20 mg $NH_3$/l and its pH is 9.5.

The present invention is not limited to the systems specifically described above but also covers the technical equivalents well known or available to the man skilled in the art. The possible variants can turn for example on the choice of reagents (lime or milk of lime; caustic soda) or on the manner of carrying out the invention. The type of heater used is without influence on the result of the invention. The prelimer may be fed with liquor from the heater at the top of the apparatus as shown in the FIGS. 1 and 2, or at the bottom. The agitator of the prelimer may be selected as is customary by the man skilled in the art. The dimensions and the shape of the still are not critical parameters for the scope of the invention, nor is the choice of the pH-meters or other equivalent measuring apparatus and of the apparatus for controlling the introduction of the balance of basic agent.

What we claim is:

1. In a method for the recovery of ammonia from liquor from filters of ammonia-soda plants which contains free ammonia and ammonium chloride, wherein the liquor is heated and traversed by a current of steam in a heating column to release more particularly the free ammonia, then is treated in a prelimer with a basic agent in an amount sufficient to decompose the major part but not the whole of the ammonium chloride with liberation of ammonia and is finally treated with steam so as to entrain liberated gaseous products in a still where there also is introduced the balance of basic agent needed to decompose the whole of the ammonium chloride, the improvement wherein: prelimer is lime, the balance used in the still is an alkali metal hydroxide, and the amount of alkali metal hydroxide added is controlled in response to the presence of ammonium ions in the still outlet so as to minimize said amount of alkali metal hydroxide added.

2. Method according to claim 1, wherein the alkali metal hydroxide is added in such an amount that the total amount of lime and alkali metal hydroxide added to the liquor is substantially equal to the stoichiometric amount of basic agent necessary to dissociate all the ammonium chloride of the liquor.

3. Method according to claim 1 wherein the amount of alkali metal hydroxide to be introduced in the liquor in the still is controlled by measuring the pH of the liquor just before removing the liquor out of the still.

4. Method according to claim 1 wherein the balance of basic agent introduced into the still is an aqueous solution of caustic soda.

5. Method according to claim 4, wherein the balance of basic agent introduce into the still is an aqueous solution of electrolytic caustic soda.

6. Method according to claim 1 wherein the alkali metal hydroxide is introduced in the liquor on a tray of the still adjacent to but before the last tray of the still with respect to the direction of the liquor circulation in the still, in an amount adapted to maintain the pH of the liquor leaving the still at about 9.5.

7. Method according to claim 6 wherein pH measurements of the liquor are carried out respectively on the last tray of the still and on the tray before the tray whereon the alkali metal hydroxide is introduced in the liquor.

8. Method according to claim 5 wherein the aqueous solution of electrolytic caustic soda contains sodium chloride.

* * * * *